(12) United States Patent
Gennasio et al.

(10) Patent No.: US 10,527,209 B2
(45) Date of Patent: Jan. 7, 2020

(54) ROTARY JOINT FOR A HIGH PRESSURE FLUID

(71) Applicant: Alfa Gomma S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: Alfa Gomma S.p.A., Vimercate (Monza Brianza) (IT)

( * ) Notice: Subject to any disclaimer, the term of this patent is extended or adjusted under 35 U.S.C. 154(b) by 159 days.

(21) Appl. No.: 15/308,928

(22) PCT Filed: May 5, 2015

(86) PCT No.: PCT/EP2015/059862
§ 371 (c)(1),
(2) Date: Nov. 4, 2016

(87) PCT Pub. No.: WO2015/169805
PCT Pub. Date: Nov. 12, 2015

(65) Prior Publication Data
US 2017/0074442 A1 Mar. 16, 2017

(30) Foreign Application Priority Data
May 7, 2014 (IT) .............................. MI20140164 U

(51) Int. Cl.
*F16L 17/025* (2006.01)
*F16L 27/08* (2006.01)

(52) U.S. Cl.
CPC ......... *F16L 27/0816* (2013.01); *F16L 17/025* (2013.01)

(58) Field of Classification Search
CPC ........................... F16L 27/0816; F16L 17/025
See application file for complete search history.

(56) References Cited

U.S. PATENT DOCUMENTS

| 2,726,104 A | 12/1955 | Boitnott et al. |
| 4,801,160 A * | 1/1989 | Barrington ............ F16L 19/005 285/110 |

(Continued)

FOREIGN PATENT DOCUMENTS

| DE | 19605797 A1 | 8/1997 |
| DE | 102006061330 A1 | 7/2008 |

(Continued)

OTHER PUBLICATIONS

International Search Report and PCT Written Opinion of ISA dated Jul. 16, 2015 issued in corresponding PCT International Applicaiton No. PCT/EP2015/059862.

*Primary Examiner* — David Bochna
*Assistant Examiner* — James A Linford
(74) *Attorney, Agent, or Firm* — Troutman Sanders LLP

(57) ABSTRACT

The rotary joint for a high pressure fluid, comprising a stator body, a rotor body, a fluid seal interposed between the stator body and the rotor body, and a friction reducer interposed between the stator body and the rotor body, the friction reducer comprising at least a first plain bearing for sustaining axial loads, and at least a second plain bearing for sustaining bending loads, the first and second bearings being made of a polytetrafluoroethylene-based (PTFE) material.

10 Claims, 1 Drawing Sheet

(56) References Cited

U.S. PATENT DOCUMENTS

| | | | | |
|---|---|---|---|---|
| 8,919,273 | B1* | 12/2014 | Hoffman | B63B 13/00 114/312 |
| 2001/0045782 | A1* | 11/2001 | Lieu | G11B 19/2009 310/67 R |
| 2004/0188255 | A1* | 9/2004 | Kennedy | G01N 27/44704 204/452 |
| 2008/0018181 | A1* | 1/2008 | Neal | H02K 9/20 310/54 |
| 2010/0025337 | A1* | 2/2010 | Yencho | C02F 1/325 210/748.1 |
| 2010/0201120 | A1 | 8/2010 | Bolivar et al. | |
| 2011/0148098 | A1* | 6/2011 | Flynn | F16L 25/01 285/145.2 |

FOREIGN PATENT DOCUMENTS

| | | | | |
|---|---|---|---|---|
| DE | 102010027926 | A1 * | 9/2011 | F16L 27/0816 |
| EP | 0879982 | A2 | 11/1998 | |
| FR | 2438789 | A2 | 5/1980 | |
| FR | 2683018 | A1 | 4/1993 | |
| WO | 2007/071047 | A1 | 6/2007 | |

* cited by examiner

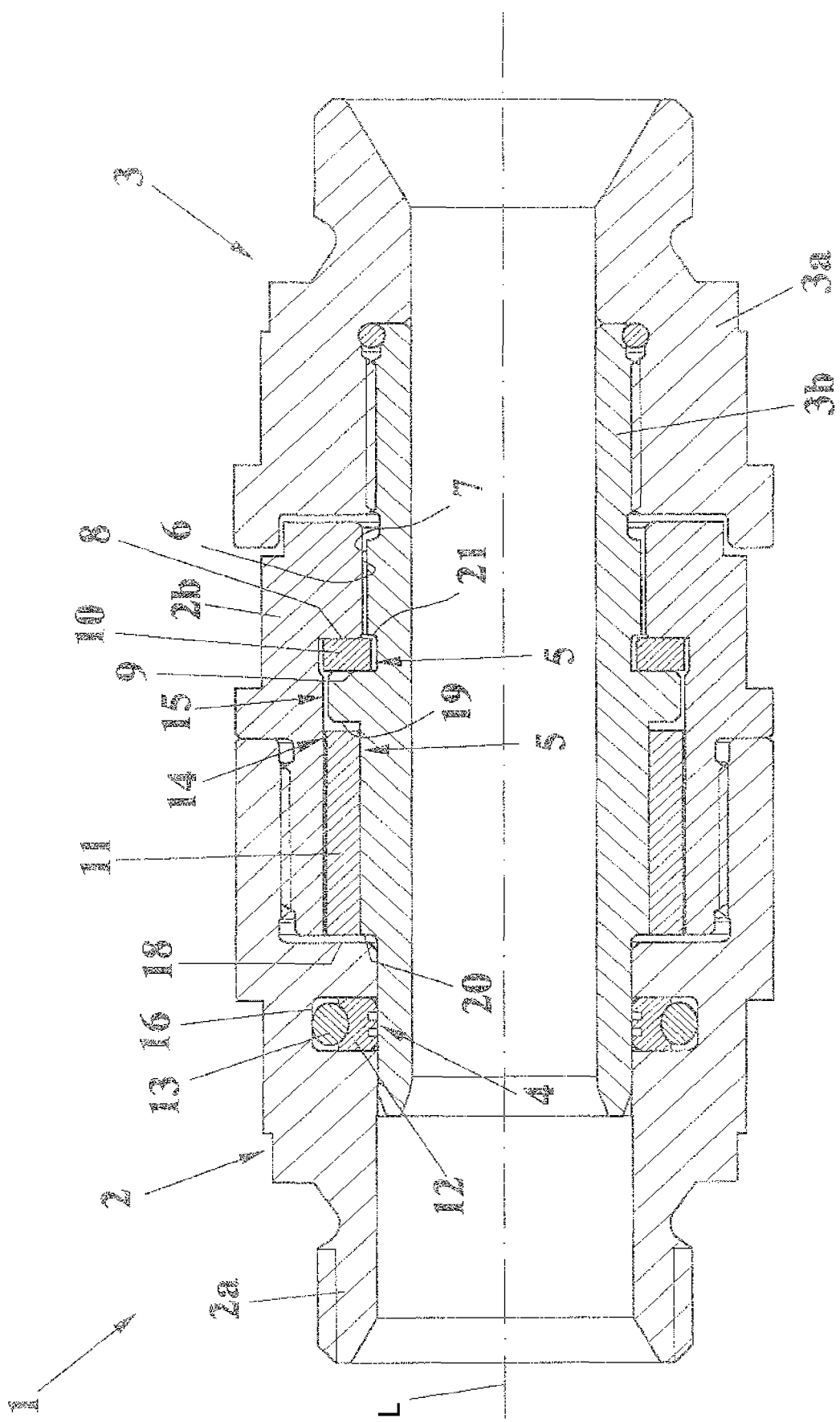

ROTARY JOINT FOR A HIGH PRESSURE FLUID

CROSS-REFERENCE TO RELATED APPLICATIONS

This application is a U.S. National Phase Application under 35 U.S.C. § 371 of International Patent Application PCT/EP2015/059862, filed May 5, 2015, which claims priority to Italian Patent Application No. MI2014U000164, filed May 7, 2014. The entire contents of these applications are hereby incorporated by reference.

FIELD OF THE INVENTION

The present invention refers to a rotary joint for high pressure fluids that can be used in applications in the field of industry or agriculture, particularly for earth-moving machinery, lifting machinery, and farm machinery.

BACKGROUND

Hydraulic or oleodynamic rotary joints equipped with roller bearings of various shapes have seen wide distribution on the market for some time. Such roller bearings are arranged between the stator body and the rotor body to reduce friction and sustain the axial loads and the bending loads to which the joint is subjected by the pressure of the fluid, which in some applications can even reach several hundred bars.

It is known that generally sealing systems made up of O-rings or similar gaskets are associated with these friction reduction systems.

These conventional friction reduction and sealing systems can involve several drawbacks and particularly limited effectiveness, which does not enable a reduction below a certain threshold of the torque required to set the rotor body into rotation with respect to the stator body.

In addition, these conventional friction reduction and sealing systems determine a marked increase in the dimensions of the joint in a radial direction.

SUMMARY

Therefore, the task proposed by the present invention is to offer a rotary joint for a high pressure fluid that eliminates the drawbacks of the prior art mentioned above. Within the scope of this task, one aim of the invention is to realize a rotary joint for a high pressure fluid that reduces to a minimum the torque required to set the rotor body into rotation with respect to the stator body of the joint.

Another aim of the invention is to realize a rotary joint for a high pressure fluid that is able to offer a high axial load bearing and bending bearing capacity while also having reduced dimensions in a radial direction.

The aim of realizing a rotary joint for a high pressure fluid that is simple in construction is not least in importance.

The task as well as these and other aims, according to the present invention, are achieved by realizing a rotary joint for a high pressure fluid, comprising an axially hollow stator body that is open at the ends, an axially hollow rotor body that is open at the ends, fluid sealing means interposed between the stator body and the rotor body, and friction reduction means interposed between the stator body and the rotor body, characterized in that said friction reduction means comprises at least a first plain bearing for sustaining axial loads, and at least a second plain bearing for sustaining bending loads, said first and second bearings being made of a polytetrafluoroethylene-based (PTFE) material.

Other characteristics of the present invention are also defined in the claims herein below.

Advantageously, the exclusive use of plain bearings, replacing the roller bearings traditionally used, on the one hand makes it possible to reduce the dimensions of the joint in a radial direction and on the other hand, owing to the choice of a specific constituent material, ensures particularly high efficacy for a wide variety of applications.

Compared to a traditional rotary joint with roller bearings, a rotary joint for a high pressure fluid with sliding bearings in accordance with the present invention also proves to be less noisy, more effective in absorbing shocks and vibrations, simpler to install, and generally also less expensive.

In the minimum configuration, the rotary joint according to the present invention has only one first plain bearing for resisting axial loads and only one second plain bearing for resisting radial loads, but naturally more first plain bearings for resisting axial loads and/or more second plain bearings for resisting radial loads can be provided.

BRIEF DESCRIPTION OF THE DRAWING

Further characteristics and advantages will become more evident from the detailed description of the rotary joint for a high pressure fluid according to the invention, which is illustrated by way of approximate example in the attached FIGURES, wherein:

FIG. 1 is an axial section view of the rotary joint.

DETAILED DESCRIPTION

With reference to the FIGURES cited, a rotary joint for a high pressure fluid is shown and indicated in its entirety by reference number 1.

The rotary joint 1 comprises a stator body 2 that is preferably, but not necessarily made of metal, axially hollow and open at the ends and a rotor body 3 that is preferably, but not necessarily made of metal, axially hollow, open at the ends and coaxially intersecting in a given area with the stator body 2.

In the area of the intersection of the stator body 2 with the rotor body 3, the external lateral surface 7 of the rotor body 3 faces the internal lateral surface 6 of the stator body 2.

The stator body 2 is made up of two threaded lengths 2a and 2b that are fixed one to the other by screwing, and likewise, the rotor body 3 is made up of two threaded lengths 3a and 3b that are fixed one to the other by screwing.

The lateral surfaces 6, 7 facing each other substantially have the configuration of cylinders oriented coaxially with the axis L of the joint 1 and exhibiting discontinuities in diameter.

The discontinuities in the inside diameter of the stator body 2 in the area of the intersection with the rotor body 3 define a recess 14 that extends radially with respect to the direction of the axis L of the joint 1.

The discontinuities in the outside diameter of the rotor body 3 in the area of the intersection with the stator body 2 define a projection that extends radially with respect to the direction of the axis L of the joint 1 and engages in the recess 14 to prevent the rotor body 3 from axially sliding off the stator body 2.

The recess 14 and the respective projection 15 have frontal surfaces 8, 18 and 9, 19, 20, 21, respectively, that is to say surfaces that extend radially to the axis L of the joint 1.

Specific fluid sealing means 4 and specific friction reduction means 5 are interposed between the stator body 2 and the rotor body 3.

The friction reduction means 5 advantageously comprises at least a first plain bearing 10 for sustaining axial loads and at least a second plain bearing 11 for sustaining bending loads.

The bearing 10 is operative between the frontal surfaces 8, 9 that face each other, whereas the bearing 11 is operative between the lateral surfaces 6, 7 that face each other.

The first plain bearing 10 and the second plain bearing 11 are made of a polytetrafluoroethylene-based (PTFE) material, for example pure polytetrafluoroethylene (PTFE) or polytetrafluoroethylene filled with carbon, metal oxides, bronze or suchlike.

The first plain bearing 10 is made up of a ring that has flat ends and is fitted onto the rotor body 3 coaxially with the axis L of the joint 1 and having an outside radius that is markedly greater than the height thereof.

The second plain bearing 11 is made up of a bushing-shaped strip fitted onto the rotor body 3 coaxially with the axis L of the joint 1.

The thickness of the wall of the first plain bearing 10 and of the second plain bearing 11 preferably ranges between 1.5 and 2.5 mm.

The first plain bearing 10 is separated and axially spaced away from the second plain bearing 11.

However, it is not excluded that the first plain bearing 10 second plain bearing 11 may be juxtaposed in a possible variant.

The first plain bearing 10 and the second plain bearing 11 are fastened to the stator body 2 or the rotor body 3.

In the illustrated solution, the first bearing 10 is glued to the frontal surface 9 of the projection 15, whereas the second plain bearing 11 is glued to the internal lateral surface 7 of the rotor body 3.

The fluid sealing means 4 comprises at least one gasket 12 made of a polytetrafluoroethylene-based (PTFE) material, for example pure polytetrafluoroethylene (PTFE) or polytetrafluoroethylene filled with carbon, metal oxides, bronze or suchlike.

The gasket 12 is integrated with an elastomeric ring 13, particularly an O-ring. The elastomeric ring 13 is preferably made of a material selected from among nitrile butadiene rubber (NBR), ethylene propylene, chloroprene, silicone or fluorocarbon.

Compared to the friction reduction means 5, the fluid sealing means 4 is closer to the end of the rotor body 3 inside the stator body 2.

In particular, with respect to the projection 15, the fluid sealing means 4 is arranged opposite the friction reduction means 5.

The fluid sealing means 4 is housed in a recess 16 in the internal lateral surface of the stator body 2.

The operation of the rotary joint 1 according to the invention appears to be clear from the description and illustration, and more specifically, it is carried out substantially as indicated herein below.

The fluid under pressure subjects the joint 1 to an axial tensile force as a result of which the first plain bearing 10 is pressed against the frontal surface 8 of the recess 14.

The first plain bearing 10 thus guides the rotation of the rotor body 3 and prevalently sustains the axial loads, whereas the second plain bearing 11, which exhibits an adequate axial extension, guides the rotation of the rotor body 3 and prevalently sustains the radial loads and the bending loads.

The gasket 12 provides for dynamic sealing, whereas the elastomer ring 13 supplies the elastic energy needed to ensure sealing activation over time by the gasket 12.

Owing to their special constituent material, the plain bearings 10 and 11 and the gasket 12 offer guarantees of adequate mechanical strength and chemical resistance, a high-lubricating capacity, high embeddability of abrasive particles with which they may come into contact, the absence of stick-slip, wear resistance, reliability over time, low friction resistance, low cost, and operability in a wide range of operating temperatures and pressures.

The invention claimed is:

1. A rotary joint for a high pressure fluid, comprising:
an axially hollow stator body that is open at the ends,
an axially hollow rotor body that is open at the ends,
a fluid seal interposed between the stator body and the rotor body, and
a friction reducer interposed between the stator body and the rotor body,
wherein said friction reducer comprises at least a first plain bearing for sustaining axial loads, and at least a second plain bearing for sustaining bending loads, said first and second bearings being made of a polytetrafluoroethylene-based (PTFE) material,
wherein the first plain bearing and the second plain bearing work simultaneously,
wherein the first plain has an annular friction surface orthogonal to an axis of a joint,
wherein the second plain bearing has a cylindrical friction surface arranged coaxially with the axis of the joint,
wherein the first plain bearing engages a frontal surface of a projection of the rotor body in a recess of the stator body,
wherein the first plain bearing is made of axially overlapping first and second flat annular surfaces, and
wherein the first flat annular surface engages with the stator body, and the second flat annular surface engages with the rotor body.

2. The rotary joint for a high pressure fluid according to claim 1, wherein said first plain bearing is made up of a ring that has flat ends and is arranged coaxially with the axis of the joint.

3. The rotary joint for a high pressure fluid according to claim 1, wherein said second plain bearing is made up of a bushing-shaped strip arranged coaxially with the axis of the joint.

4. The rotary joint for a high pressure fluid according to claim 1, wherein said first and second plain bearings are spaced away from each other.

5. The rotary joint for a high pressure fluid according to claim 1, wherein said first and second plain bearings are juxtaposed.

6. The rotary joint for a high pressure fluid according to claim 1, wherein said first plain bearing is glued to said stator body or said rotor body.

7. The rotary joint for a high pressure fluid according to claim 1, wherein said second plain bearing is glued to said stator body or said rotor body.

8. The rotary joint for a high pressure fluid according to claim 1, wherein said fluid seal comprises at least one gasket made of a polytetrafluoroethylene-based (PTFE) material.

9. The rotary joint for a high pressure fluid according to claim 8, wherein said gasket is integrated with an elastomeric ring.

10. The rotary joint for a high pressure fluid according to claim 9, wherein said elastomeric ring is an O-ring.

\* \* \* \* \*